Aug. 30, 1966   C. A. SUTHERLAND   3,269,830
PRODUCTION OF NIOBIUM FROM NIOBIUM PENTACHLORIDE
Filed April 6, 1962
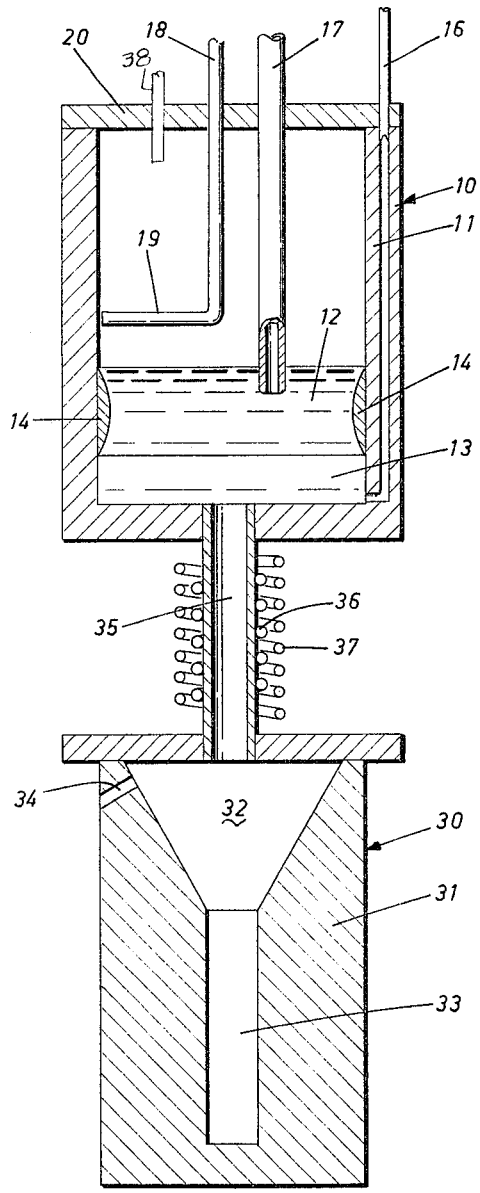
INVENTOR.
CHARLES A. SUTHERLAND
Attorney United States Patent Office 3,269,830
Patented August 30, 1966

3,269,830
PRODUCTION OF NIOBIUM FROM NIOBIUM PENTACHLORIDE
Charles A. Sutherland, Trail, British Columbia, Canada, assignor to The Consolidated Mining and Smelting Company of Canada Limited, Montreal, Quebec, Canada, a corporation of Canada
Filed Apr. 6, 1962, Ser. No. 185,642
2 Claims. (Cl. 75—84.5)

This invention relates to the production of niobium from niobium pentachloride.

In one process for the production of niobium, niobium pentachloride and an alkali metal fluoride are reacted in a fused salt bath to form alkali metal niobium fluoride which, in turn, is reacted with zinc to form a niobium-zinc reduction product which is treated for the recovery of niobium.

The reactions can be carried out in a reaction vessel containing a bath of fused salt floating on a bath of molten zinc. However, the niobium-zinc reduction product formed by the reactions is deposited on the walls of the reaction vessel above the zinc bath, and the efficient recovery of this reduction product for subsequent treatment presents a number of problems.

These problems include possible contamination of the reduction product and the fused salt bath by contact with air or water, exposure of the interior of the reaction zone to the atmosphere during charging and discharging operations, loss of salt in steps required to separate salt from the reduction product, and cost of and damage to equipment if removable liners are used for the reaction zone, and if the reaction vessel is subjected to alternate cycles of heating and cooling.

I have found that these problems can be overcome and other advantages can be realized by the method and apparatus of my invention.

According to my invention, the niobium-zinc reduction product that forms on the walls of the reaction vessel is collected in the bath of molten zinc, and the resulting mixture is discharged from the reaction vessel into a separate settling vessel wherein the reduction product is concentrated in a relatively small amount of molten zinc. The niobium can be readily recovered from this concentrated material. The remainder of the zinc discharged from the reaction vessel to the settling vessel can be re-cycled to the reaction vessel, if desired.

In general, the method of the present invention for the production of niobium comprises the steps of feeding niobium pentachloride into a fused sodium chloride-potassium chloride salt mixture contained in a reaction zone which also contains an alkali metal fluoride in amount sufficient to combine with the niobium content of the niobium pentachloride as potassium-niobium fluoride double salt, maintaining a non-oxidizing atmosphere in the reaction zone, providing a bath of molten zinc in said reaction zone below said fused salt mixture for reaction with the potassium-niobium fluoride double salt to form a niobium-zinc reduction product, collecting niobium-zinc reduction product in the bath of molten zinc, intermittently passing molten zinc and collected niobium-zinc reduction product to a settling zone in communication with said reaction zone, and separating niobium in elemental form from the niobium-zinc reduction product collected in said settling zone.

In the operation of the present method, niobium pentachloride, $NbCl_5$, dissolves in the fused salt bath to form potassium niobium fluoride, $K_2NbF_7$. It is found that the niobium-zinc reduction product forms in the zinc layer only to a limited extent. Most, if not all, of the niobium-zinc reduction product, in the method of this invention, forms as a deposit on the wall of the container above the level of the molten zinc bath, as indicated by the numeral 14 in the drawing, which indicates that the reduction actually occurs in the fused salt bath. Thus, it is believed that the reduction of the potassium niobium fluoride and the formation of the niobium-zinc reduction product are caused by the zinc dissolved in the fused salt bath. The reducing reaction can be explained as proceeding in the fused salt bath which, in the upper part where the niobium pentachloride is fed into the bath, is rich in potassium niobium fluoride and low in zinc, and which, in the lower part adjacent to the zinc layer, is low in potassium niobium fluoride and rich in dissolved zinc.

The best results are obtained in the operation of the method when an adequate supply of zinc, that is, an amount in excess of that required to combine with the niobium-zinc reduction product, is dissolved in the fused salt bath. The zinc supply in the fused salt bath can be increased by increasing the temperature of the bath or, preferably, by providing a small flow of inert gas, such as argon, through the zinc layer into the salt bath. The inert gas serves to agitate the zinc and, possibly, carries zinc vapour into the salt bath. It also serves to agitate the salt bath. It is found that if the flow of inert gas is too strong, niobium-zinc reduction product tends to deposit around the niobium pentachloride tube and thus closes the outlet end to the flow of niobium pentachloride vapour. The flow of inert gas should be sufficient to agitate the pool of zinc and the salt bath gently to ensure distribution of the reactants throughout the bath.

The apparatus for the production of niobium according to this invention comprises a closed container having a reaction zone adapted to receive a fused salt mixture and a bath of molten zinc, an internal lining for the container resistant to attack by molten zinc and alkali metal chlorides and fluorides, inlet means for feeding niobium pentachloride into the reaction zone in said container, inlet means for feeding an inert gas into said bath of molten zinc, means for providing a supply of molten zinc in said container exposed to the fused salt bath, means for removing material deposited on the walls of the container, a collecting vessel, a closable passageway extending from said reaction zone to said collecting vessel, and means for opening said passageway at predetermined intervals.

An understanding of the method and apparatus of this invention can be obtained from the following description, reference being made to the accompanying drawing which is an elevation in section of a preferred modification of the apparatus.

Like reference characters refer to like parts throughout the description of the invention and the drawing.

Referring to the drawing, the numeral 10 indicates a container of suitable shape, for example rectangular or circular. It preferably is formed of a stainless steel shell lined with a lining 11, such as graphite, which is resistant to corrosion by the fused bath 12 and by molten zinc, and which provides a surface on which solid niobium-zinc reduction product deposits and grows as the reaction proceeds between the zinc and the potassium niobium fluoride, as indicated by the numeral 14.

An inlet pipe 16, preferably formed of graphite or other corrosion resistant material, extends through the cover 20 downwardly into the container and terminates in an open end in the bath of molten zinc 13 positioned at the bottom of the container below the fused salt bath. An inert gas, such as argon, is fed through the pipe 16 into the bath of molten zinc.

An inlet pipe 17, also formed of graphite or other corrosion resistant material, extends through the cover 20 into the container terminating with an open end, in the fused salt bath 12.

A scraper member 18 extends downwardly through the cover 20 into the container. It is provided with a scraper blade 19 which extends to the lining 11. The scraper member is movable in a vertical plane and is adapted to be actuated at predetermined intervals to scrape the deposit 14 of niobium-zinc reduction product from the wall.

A settling pot 30 having a lining 31 formed of graphite or other corrosion resistant material is positioned below the container 10 and is in communication with the container through a closable passageway 35 which extends from the container to the settling vessel. The upper part 32 of the chamber defined by the lining of the settling pot is preferably of larger diameter than the lower part 33, thus to provide a settling zone of restricted diameter in the lower part of the settling vessel for the collection of the niobium-zinc reduction product which is rich in niobium and which is of substantially higher density than molten zinc. An outlet 34 is provided in the upper part of the settling vessel for the discharge therefrom of fused salt.

The passageway 35 normally is closed during the operation of the niobium-zinc reduction product forming reaction. A preferred arrangement is to close the passageway with a solid plug of zinc. When it is desired to empty the contents of the container into the settling vessel, it merely is necessary to heat the passageway and melt the zinc plug. Solidifying and melting the zinc plug in the passageway can be effected by conventional cooling coils 36 and electrical heating elements 37. Conventional means (not shown) are used to control the temperatures in the container and settling pot 30.

In the operation of the method, the container 10 is filled to predetermined levels with a bath of molten zinc and a fused sodium chloride-potassium chloride-alkali metal fluoride salt mixture. The removable cover 20 is then placed in position and the container is purged with an inert gas, such as argon, the flow of which is continued during the reaction to agitate gently the molten zinc and to distribute zinc through the fused salt bath. Argon escapes from the container through an outlet 38 in the cover 20. Niobium pentachloride vapour is fed through the pipe 17 into the fused salt bath. During the reaction, niobium-zinc reduction product builds up on the walls of the vessel as indicated by the numeral 14. This deposit 14 is periodically scraped from the container walls by the blade 19, and is collected in the pool of molten zinc. When sufficient product has been collected, the flows of inert gas and niobium pentachloride are stopped, the passageway 35 is heated to melt the zinc plug, and the contents of the container are emptied into the settling vessel which has been purged with argon. The passageway 35 is then cooled, the container is recharged with molten zinc and fused salt mixture and the sequence of operations is repeated.

The contents of the settling vessel 30 are held at a temperature of from about 600° C. to about 750° C. to permit the higher density niobium-zinc reduction product crystals to settle into the lower restricted portion 33. After the product has settled, the molten zinc is cooled, forming an ingot. The lower portion of the ingot contains the niobium-zinc reduction product and is therefore rich in niobium; the upper portion is relatively barren. The ingot is removed from the settling vessel, and the lower portion is cut from it. Zinc is removed from this small, niobium-rich portion of the ingot, for example by vacuum distillation, leaving as residue niobium crystals substantially free from zinc and other impurities. The upper, barren portion of the ingot and the condensed zinc from the distillation step can be re-melted and returned to the container 10.

The reactions involved in the operation of the method can be expressed by the following equations:

$$NbCl_5 + 7KF \rightarrow K_2NbF_7 + 5KCl \quad (1)$$
$$2K_2NbF_7 + 11Zn \rightarrow 2NbZn_3 + 5ZnF_2 + 4KF \quad (2)$$
$$ZnF_2 + 2KCl \rightarrow ZnCl_2 + 2KF \quad (3)$$

The niobium pentachloride first reacts with the fluoride to form potassium niobium fluoride which reacts with the zinc to form, as identified herein, a niobium-zinc reduction product. This intermetallic reduction product deposits and grows on the lining of the container in the form of a relatively loosely adherent deposit of niobium-zinc crystals which can be easily detached from the lining by the scraper blade 19. The specific gravity of the niobium-zinc reduction product is greater than that of the fused salt bath and the molten zinc. Thus, when the niobium-zinc crystals are detached from the lining, they settle through the fused salt bath to the lower part of the bath of molten zinc from which they are recovered in the manner described above.

The fused salt bath can be prepared with 1.0 part potassium chloride, 0.262 part sodium chloride, 0.393 part sodium fluoride. When saturated with niobium pentachloride, this fused salt mixture contained, by weight, 40% sodium chloride, 40% potassium chloride and 20% potassium niobium fluoride.

Theoretically, a total of 1.317 grams of zinc is required per gram of niobium pentachloride, 0.592 gram of zinc being required for the reduction of potassium niobium fluoride and 0.725 gram being required for niobium-zinc crystallization as $NbZn_3$. For optimum results in the operation of the process, zinc should be provided in excess of the theoretical requirement for formation of the compound $NbZn_3$. If the amount of zinc present during the process is not in excess of the amount theoretically required to form $NbZn_3$, the niobium-zinc reduction product is deposited as very fine crystals. This fine crystal size causes difficulty in the subsequent recovery of the niobium after removal of the zinc. Preferably, therefore, more zinc is provided than is required for the formation of the compound $NbZn_3$, which is deposited in coarsely crystalline form in the presence of excess zinc. In the method of the present invention, the use of the bath of molten zinc ensures that there is always excess zinc present in the reaction vessel.

Satisfactory results are obtained in the operation of the process at a temperature within the range of from about 700° C. to about 880° C., preferably about 750° C. The melting point of a 1:1 molar sodium chloride-potassium chloride fused salt bath is about 658° C. and the maximum temperature of the bath is limited to 905° C., the boiling point of zinc.

The following example illustrates the operation of the present method and apparatus for the production of niobium:

Reaction vessel:
    Operating temperature, ° C. _____ 750
    Weight of fused salt bath, grams _____ 3540
    Weight of niobium pentachloride added, grams _____ 2350
    Weight of zinc added, grams _____ 20,000
Settling vessel:
    Settling period, 3 hours at 600° C.
    Weight of niobium rich portion of ingot, grams _____ 6300
    Weight of niobium-zinc crystals produced, grams _____ 2000
    Weight of niobium in the niobium-zinc crystals, grams _____ 650
    Percent of niobium contained in the niobium pentachloride recovered in the crystals, percent _____ 81

The niobium-zinc reduction product can be treated by any one of several methods for the separation and separate recovery of the niobium and zinc. The preferred method is vacuum distillation to vapourize the zinc, which is subsequently condensed and, if desired, returned to the reaction zone of the process. The niobium crystals remaining after distillation of zinc are stabilized by heating in a vacuum at from about 1700° C. to about 2000° C. The resulting product is a niobium sponge which can be converted to powder by mechanical means.

The method of this invention possesses a number of important advantages. Zinc is readily available and inexpensive. The niobium-zinc reduction product has a density greater than zinc and is readily collected at the base of a column of molten zinc. Zinc is readily removed from the niobium-zinc reduction product.

Furthermore, in the improved method of this invention, the interior of the reaction vessel, once purged, need never be exposed to the oxygen and water vapour of the atmosphere. With supplies of molten zinc and fresh salt maintained ready for charging to the reaction vessel at the end of each reduction cycle, continuity of operation is ensured and repeated cooling and heating of the vessel are avoided.

Also, tantalum usually is associated with niobium in the niobium bearing material from which the pentachloride is produced and, if so, may be, and usually is, present in the pentachloride. It is found that alkali metal tantalum fluoride does not react readily with the zinc to produce a tantalum-zinc reduction product. Thus, it is found that niobium which is substantially free from tantalum can be produced by this method from a niobium pentachloride which contains tantalum. Thus, an essential step in the preparation of niobium pentachloride for the conventional direct reduction system is unnecessary when using the process of the present invention. For example, in tests as described above with niobium pentachloride feed containing 2% to 5% tantalum pentachloride by weight, the tantalum content of the niobium metal produced ranged from a maximum amount of about 0.1% to an amount not detectable by spectrographic methods.

A further important advantage of the method described above over the conventional direct reduction system is that a completely oxygen-free reduction system and chloride feed material, while desirable, are not essential for the production of low oxygen niobium as any oxygen present forms potassium niobium oxyfluoride, $K_2NbOF_5$, which is not reduced by the zinc.

It will be understood, of course, that modifications can be made in the preferred embodiments of the method described above without departing from the scope of the invention defined by the appended claims.

What I claim as new and desire to protect by Letters Patent of the United States is:

1. In a method for the production of niobium which comprises the steps of: feeding niobium pentachloride into a fused sodium chloride-potassium chloride salt mixture contained in a reaction zone which contains an alkali metal fluoride in amount sufficient to combine with the niobium content of the niobium pentachloride as potassium niobium fluoride double salt; maintaining a non-oxidizing atmosphere in the reaction zone; and providing a bath of molten zinc below said fused salt mixture, said bath containing zinc in excess of the amount required for formation of $NbZn_3$; the improvement which comprises collecting $NbZn_3$ in the bath of molten zinc; intermittently passing molten zinc and collected $NbZn_3$ to a settling zone, said settling zone communicating intermittently with said reaction zone, by means of a passageway extending therebetween, the intermittent communication being provided by alternately melting and freezing zinc in the passageway between said reaction zone and said settling zone; collecting $NbZn_3$ in the lower part of said settling zone; recycling zinc from the upper part of said settling zone to said reaction zone; cooling $NbZn_3$ and molten zinc in the lower part of said settling zone to form an ingot; and recovering niobium in elemental form from said ingot.

2. In a method for the production of niobium which comprises the steps of: feeding niobium pentachloride into a fused sodium chloride-potassium chloride salt mixture contained in a reaction zone which contains an alkali metal fluoride in amount sufficient to combine with the niobium content of the niobium pentachloride as potassium niobium fluoride double salt; maintaining a non-oxidizing atmosphere in the reaction zone; providing a bath of molten zinc below said fused salt mixture, said bath containing zinc in excess of the amount required for formation of $NbZn_3$; and collecting $NbZn_3$ in solid form on the wall of the reaction zone; the improvement which comprises scraping $NbZn_3$ from the wall of the reaction zone to settle in the bath of molten zinc; intermittently passing molten zinc and collected $NbZn_3$ to a settling zone, said settling zone communicating intermittently with said reaction zone, by means of a passageway extending therebetween, the intermittent communication being provided by alternately melting and freezing zinc in the passageway between said reaction zone and said settling zone; collecting $NbZn_3$ in the lower part of said settling zone; recycling zinc from the upper part of said settling zone to said reaction zone; cooling $NbZn_3$ and molten zinc in the lower part of said settling zone to form an ingot; and recovering niobium in elemental form from said ingot.

References Cited by the Examiner

UNITED STATES PATENTS

| | | | |
|---|---|---|---|
| 1,281,443 | 10/1918 | Walker | 266—22 |
| 1,943,330 | 1/1934 | Mitchell | 210—268 X |
| 2,880,987 | 4/1959 | Hnilicka et al. | 266—9 |
| 2,941,867 | 6/1960 | Mauren | 75—84.5 X |
| 3,068,066 | 12/1962 | Scheller et al. | 75—84.5 X |
| 3,071,459 | 1/1963 | Elger et al. | 75—84.5 |
| 3,102,807 | 9/1963 | Chisholm | 75—84.5 |
| 3,157,493 | 11/1964 | Robinson | 75—84.5 |

FOREIGN PATENTS

| | | |
|---|---|---|
| 671,054 | 4/1954 | Great Britain. |
| 763,731 | 12/1956 | Great Britain. |
| 876,802 | 9/1961 | Great Britain. |

DAVID L. RECK, *Primary Examiner.*

WINSTON A. DOUGLAS, BENJAMIN HENKIN,
*Examiners.*

H. W. CUMMINGS, H. W. TARRING,
*Assistant Examiners.*